(12) United States Patent
Borgaonkar et al.

(10) Patent No.: US 8,195,425 B2
(45) Date of Patent: Jun. 5, 2012

(54) SYSTEMS AND METHODS FOR ESTIMATING DISTANCES USING MULTI-RESOLUTION FUNCTIONS

(75) Inventors: Shekhar Ramachandra Borgaonkar, Karnataka (IN); Prasenjit Dey, Karnataka (IN); Deepu Vijayasenan, Martigny (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 11/718,233

(22) PCT Filed: Nov. 23, 2004

(86) PCT No.: PCT/IN2004/000363
§ 371 (c)(1), (2), (4) Date: Feb. 9, 2009

(87) PCT Pub. No.: WO2006/057004
PCT Pub. Date: Jun. 1, 2006

(65) Prior Publication Data
US 2009/0204364 A1    Aug. 13, 2009

(51) Int. Cl.
*G01C 22/00* (2006.01)
*G01S 15/00* (2006.01)
*G01S 13/08* (2006.01)

(52) U.S. Cl. .................. 702/159; 367/100; 342/145

(58) Field of Classification Search ............... 342/145; 702/159; 367/100
See application file for complete search history.

(56) References Cited

U.S. PATENT DOCUMENTS

| | | | | |
|---|---|---|---|---|
| 5,745,437 A | * | 4/1998 | Wachter et al. | 367/100 |
| 6,335,723 B1 | * | 1/2002 | Wood et al. | 345/173 |
| 6,809,845 B1 | * | 10/2004 | Kim et al. | 359/9 |
| 2003/0144814 A1 | * | 7/2003 | Hama et al. | 702/159 |
| 2004/0135992 A1 | * | 7/2004 | Munro | 356/4.01 |

OTHER PUBLICATIONS

Hwang K et al: "Characterization of gas pipeline—inspection signals using wavelet basis function neural networks" Not &; E International, Butterworth-Heinemann, Oxford GB, vol. 33, No. 8, Dec. 2000, pp. 531-545, XP004292726 ISSN: 0963-8695.

* cited by examiner

*Primary Examiner* — Michael Nghiem
*Assistant Examiner* — Manuel Rivera Vargas

(57) ABSTRACT

Systems and methods for estimating the distance between a start point and a true endpoint in which at least two functions of differing resolutions are used. The method includes measuring a coarse distance between the start point and an intermediate point using the lower resolution function, the intermediate point comprising a point which is substantially within one unit of the higher resolution function away from the true endpoint. Next, a vernier distance is measured from the intermediate point to a vernier endpoint using the higher resolution function, the vernier endpoint being within a narrow, vernier error window of the true endpoint. Subsequently, the coarse and vernier distances are summed to obtain the estimated distance.

24 Claims, 7 Drawing Sheets

SYSTEMS AND METHODS FOR ESTIMATING DISTANCES USING MULTI-RESOLUTION FUNCTIONS

BACKGROUND

The present invention relates generally to distance measurement systems and methods, and more particularly to systems and methods using multi-resolution functions to estimate distances precisely.

Distance measurement systems are widely used in technical and industrial fields. For example, the well known Global Positioning System (GPS) relies heavily upon precise distance measurements in order to provide accurate location information. Other systems, such as terrestrial and space-based telecommunication systems, military systems, and positioning systems for determining the location of natural resources represent a few which critically rely upon precise distance measurements.

Pen positioning systems are another example of systems which are heavily dependent upon precise position measurements. FIG. 1 illustrates one such exemplary system which may be used, for example, to provide a digitized version of one's handwriting. As known to those skilled in the art, the position of the pen in such systems must be precisely determined, typically be on the order of 0.5 millimeters ($\times 10^{-3}$ m).

In its usual construction, the pen position system 100 includes a pen 102, sensors 104a and 104b and a processing unit 106. The position of the pen 100 on the paper 110 is determined using a triangulation process by which two distances $d_1$ and $d_2$ are determined from the pen 102 to two respective sensors 104a and 104b. In a particular embodiment of the system, pen 102 wirelessly transmits signals $S_T$. The transmitted signals $S_T$ are received by sensors 104a and 104b, each received signal $S_{R1}$ and $S_{R2}$ having an associated phase shift corresponding to the distance $d_1$ and $d_2$ traversed from the pen's position 108. Concurrently, a reference signal $S_{ref}$ is communicated from the pen 102 to a processing unit 106, which also receives the phase shifted versions of $S_{R1}$ and $S_{R2}$ via sensors 104a and 104b. The processor 106 compares the reference signal $S_{ref}$ to the received phase-shifted signals $S_{R1}$ and $S_{R2}$, and therefrom obtains the relative phase differences of the received signals $S_{R1}$ and $S_{R2}$. The phase differences for each of the signals $S_{R1}$ and $S_{R2}$ can be easily translated to corresponding distances $d_1$ and $d_2$. Once $d_1$ and $d_2$ are determined, the pen's position 108 can be ascertained using conventional triangulation techniques.

The architecture of the conventional system is limited in the ability to provide high resolution and long distance measurements. If the transmitted signal $S_T$ is chosen at a relatively low frequency, the resolution may be insufficient to accurately locate the pen even though the system can measure longer distances. If a relatively high frequency is chosen, the phase of the higher frequency signal can provide higher resolution positioning information but can measure only short distances. The distance traveled by a cycle of the wave thus limits the system's ability to make global distance measurements which is a trade-off vis-à-vis the resolution of the measurements.

What is needed is a system and method for estimating distances in which a low resolution function is used for obtaining global measurements and a high resolution function is efficiently used for obtaining local measurements.

SUMMARY

In accordance with one embodiment, a method for estimating the distance between two points, a start point and a true endpoint, is presented. The method uses multi-resolution functions in which at least two functions of differing resolutions are used. Initially, a coarse distance between the start point and an intermediate point is measured using a lower resolution function, the intermediate point including a point which is substantially within one unit of the higher resolution function away from the true endpoint. Next, a vernier distance is measured from the intermediate point to a vernier endpoint using the higher resolution function, the vernier endpoint being within a narrow, vernier error window of the true endpoint. Subsequently, the coarse and vernier distances are summed to obtain the estimated distance.

These and other aspects will be better understood in view of the following drawings and detailed description of specific embodiments.

Figure 1:
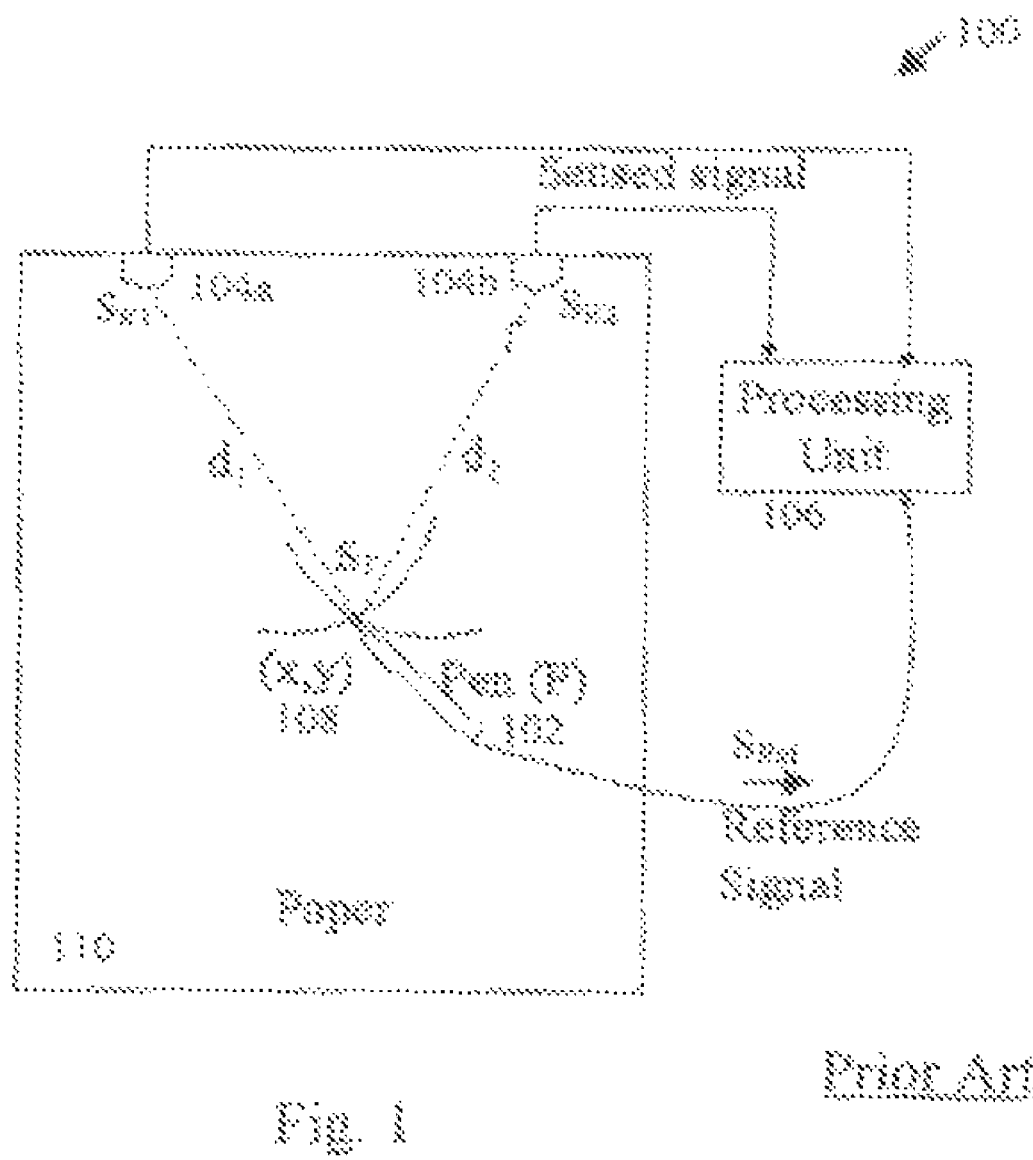
FIG. 1 illustrates a pen positioning system which uses distance estimation to compute pen position as known in the art.

For clarity, previously identified features retain their original reference numerals throughout the specification.

DETAILED DESCRIPTION

Figure 2A:
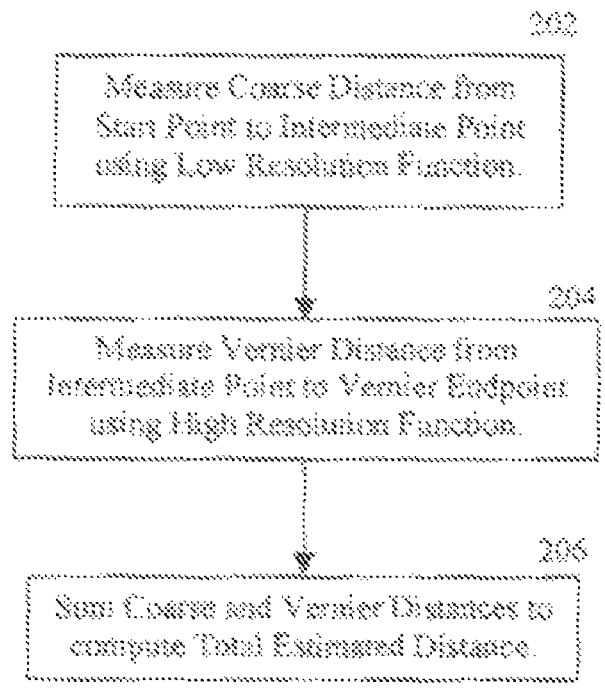
FIG. 2A illustrates a method for estimating a distance between a start point and an end point using multi-resolution functions in accordance with one embodiment of the present invention.

FIG. 2A illustrates a method for estimating a distance between a start point and an end point using a multi-resolution functions in accordance with one embodiment of the present invention. Initially at 202, a coarse distance is measured from the start point to an intermediate point using a low resolution function, the intermediate point being located between the start point and the end point. Next at 204, a vernier distance is measured from the intermediate point to a vernier end point using a high resolution function, the vernier end point being located within a high resolution window around end point. At 206, the coarse and vernier distances are summed to compute the total estimated distance between the start point and end point. Several exemplary embodiments of the high and low resolution functions used to measure the vernier and coarse distances are presented below.

Figure 2B:
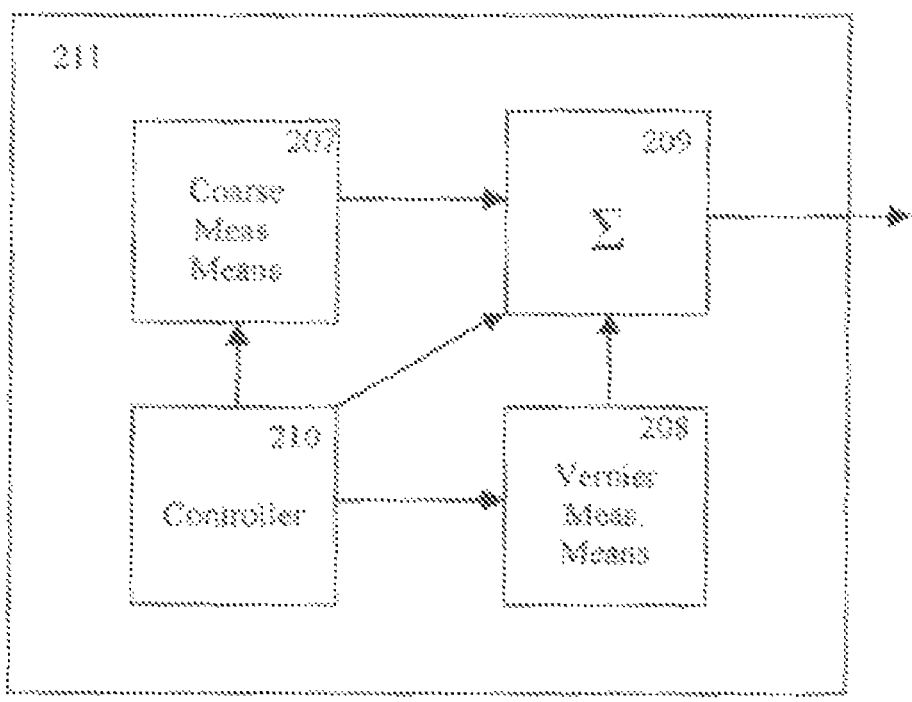
FIG. 2B illustrates an exemplary system in which the processes of FIG. 2A are used to compute an estimated distance between a start point and an end point in accordance with an embodiment of the present invention.

FIG. 2B illustrates an exemplary system in which the processes of FIG. 2A are used to compute an estimated distance between a start point and an end point. The system includes a coarse measurement means 207, a vernier measurement means 208, a summing means 209, and a control means 210. The coarse measurement means 207 is operable to obtain a coarse measurement from the start point to an intermediate point using a low resolution function, the processes of which are described in exemplary embodiments below. The vernier measurement means 208 is operable to obtain a vernier measurement from the intermediate point to a vernier end point using a high resolution function, the processes of which are illustrated in exemplary embodiments below. A summing means 209 is coupled to the coarse and vernier measuring means, and is operable to receive and add the coarse and vernier distances to produce an estimated distance. Control means 210 is coupled to the coarse measurement, vernier measurement and summing means and operable to control the operation of each. The system 211 may be implemented as software, hardware, firmware or a combination of these modalities. Further, one or more processes of system 211 may be carried out responsive to the execution of instruction code which controls a machine (e.g., a micro-processor, a computer, or measurement equipment) to perform such processes.

Figure 2C:
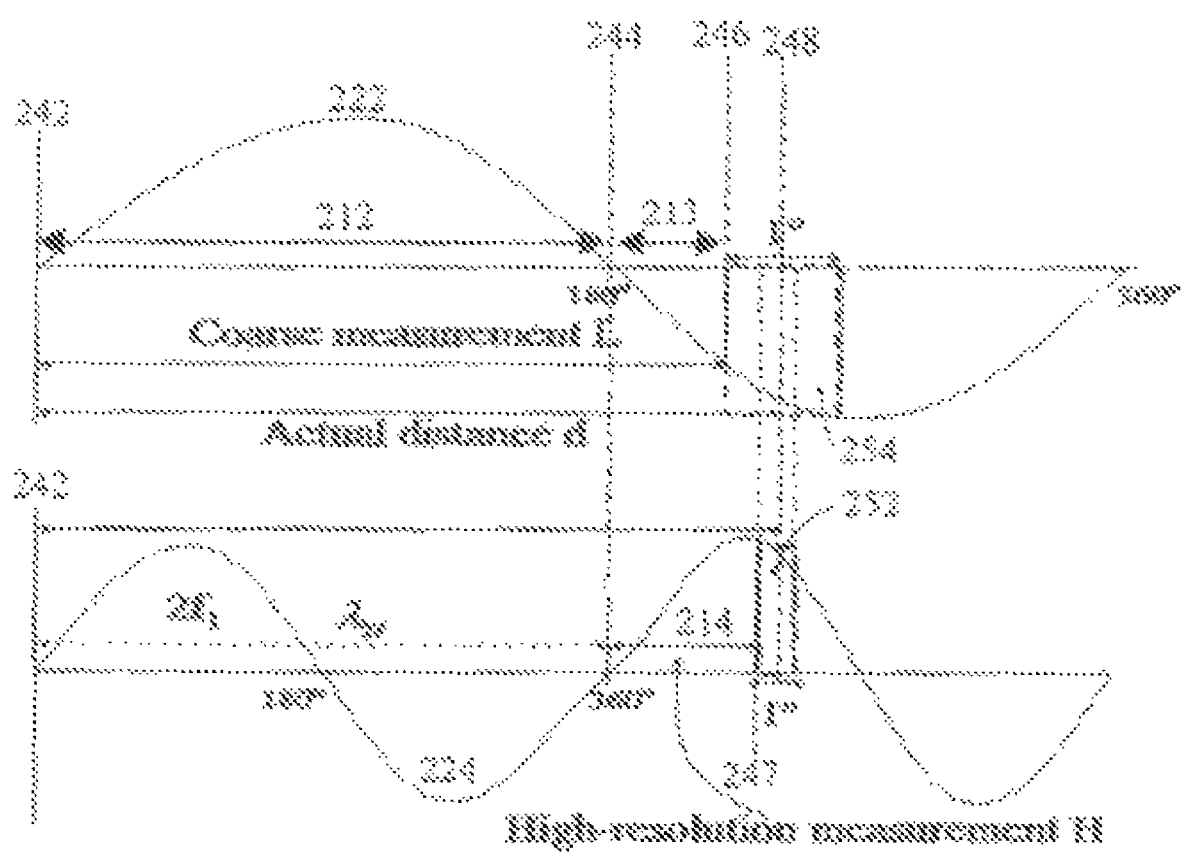
FIG. 2C illustrates a first exemplary embodiment of the processes shown in FIG. 2A for computing an estimated distance between a start point and an end point in accordance with an embodiment of the present invention.

FIG. 2C illustrates a first exemplary embodiment of the processes shown in FIG. 2A in accordance with an embodiment of the present invention. In the particular embodiment shown, a long wavelength 222 of a low frequency signal operates as the lower resolution function, and the relatively short wavelength 224 of a higher frequency signal operates as the higher resolution function.

A start point 242 is located an actual distance $d_{act}$ away from the true endpoint 248. Errors in the detection process (e.g. phase noise of the signal and/or phase noise of the detector) result in some degree of error being centered around the true endpoint 248. This error, assumed to be ±1° for purposes of the illustration, translates to a larger error region 254 for the lower resolution, longer wavelength (herein referred to generally as a "coarse error window") compared to a smaller error region 252 for the higher resolution, higher resolution short wavelength (herein referred to generally as a "vernier error window"). Thus, a more optimal solution is to employ the method of FIG. 2A by which the higher resolution function can be used to more accurately locate the true endpoint 248 so that the distance between the true end point 248 and the start point 242 can be more accurately estimated.

Referring to the particular processes shown in FIG. 2C, a coarse measurement 212 is made between a start point 242 and an intermediate point 244 using the low resolution long wavelength 222 (process corresponding to 202 in FIG. 2A). As will be further described below, the intermediate point 244 is located substantially within one unit of the high resolution function, which in the illustrated exemplary embodiment, is one wavelength of the higher resolution wavelength signal 224. In a specific embodiment, only the low resolution function is used to compute the coarse measurement.

Next, a vernier distance 214 (H) is measured between the intermediate point 244 and a vernier endpoint 247 using the higher resolution function (process 204 in FIG. 2A), whereby the vernier endpoint 247 is located within a vernier error window 252 that is located around the true endpoint 248. The magnitude of the vernier error window 252 corresponds to the resolution of the higher resolution function, i.e., the vernier error window 252 will have a smaller error window compared to coarse error window 254 corresponding to the lower resolution function. The particular location of the vernier endpoint 247 is shown for purposes of illustration only, and those skilled in the art understand that location of the vernier endpoint 247 within the vernier error window 252 is determined via a random process and cannot be accurately predicted. Accordingly, the vernier endpoint 247 may reside anywhere within the error window in a particular embodiment. In a specific embodiment, the higher resolution function is only implemented to compute the vernier measurement.

Subsequently, the coarse distance 212 and the vernier distance 214 (H) are combined to compute a total estimated distance (process 206 in FIG. 2A). The measurement functions used in the exemplary embodiment of FIG. 2C are the longer and shorter wavelength signals 222 and 224 respectively. However, those skilled in the art will appreciate that other functions may be alternatively used, as will be shown below.

Figure 3:
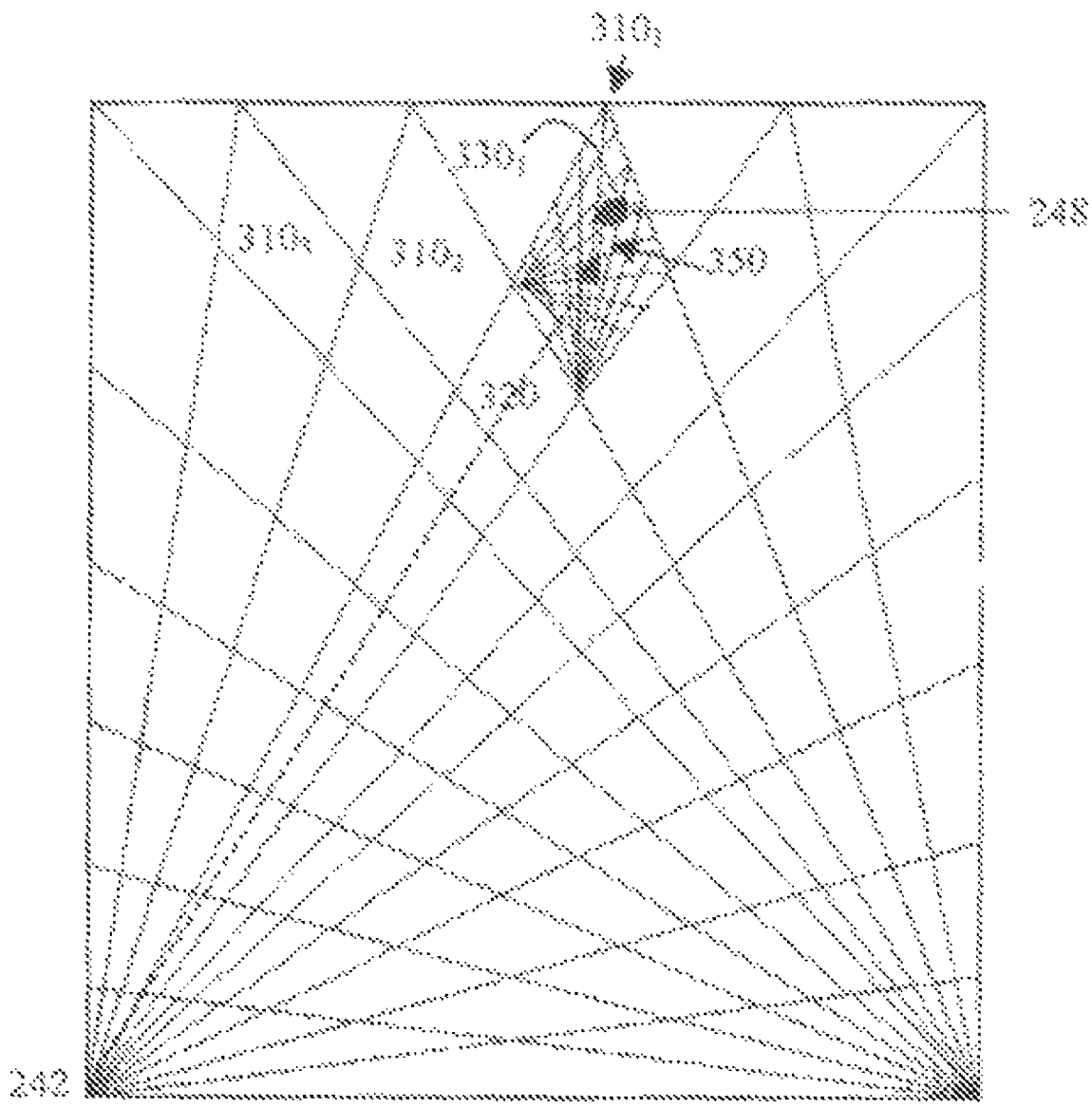
FIG. 3 illustrates a second exemplary embodiment of the processes shown in FIG. 2A for computing an estimated distance between a start point and an end point in accordance with an embodiment of the present invention.

Those skilled in the art will appreciate that other multi-resolution functions may be used equally as well in alternative embodiments. For example in another embodiment, the multi-resolution function may include the measurement of unique base angles of quadrilaterals which are formed when rays are projected over a surface at unique angles, thereby creating quadrilaterals having unique base angles. FIG. 3 illustrates an example of such a measurement process. In particular, quadrilaterals $310_1$ will each have unique base angles, and within each of these, sub-quadrilaterals $330_1$ will have unique sub-base angles. In this embodiment, a true endpoint 248 is located within one of the larger quadrilaterals $310_1$ and the base angles of the quadrilateral measured. As noted above, quadrilaterals $310_1$ and sub-quadrilaterals $330_1$ will each have a set of unique base angles which allows for determining the location of the quadrilaterals $310_1$ and sub-quadrilaterals $330_1$.

Next, the location of quadrilateral $310_1$ possessing the set of identified base angles is determined. In a particular embodiment, the lower resolution base angle measurement (e.g., a base angle measurement having a phase error $\phi \leq \pm 5°$) is used to globally scan the larger quadrilaterals to determine which contains the set of the unique base angles identified in the previous process. Next, a coarse distance measurement 320 is made between the start point 242 and the center of the quadrilateral $310_1$ which possess the set of unique base angles.

Once the larger quadrilateral $310_1$ has been identified, the aforementioned process is repeated except using the higher resolution function by which smaller sub-base angles of the sub-quadrilaterals are measured. Specifically, the true end point is detected as being located within one of the sub-quadrilaterals $330_1$, and the base angles of that sub-quadrilateral measured.

Next, the location of sub-quadrilateral $330_1$ possessing the set of identified base angles is determined. In a particular embodiment, the higher resolution base angle measurement (e.g., $\phi \leq \pm 1°$) is used to locally scan the sub-quadrilaterals $330_1$ to determine which one contains the set of the unique base angles identified in the previous process. Next, a vernier distance measurement 350 is made between the intermediate point and the center of the quadrilateral $310_1$ which possess the set of unique base angles. This embodiment is only exemplary and other angular resolutions can be used, one being of relatively higher measurement resolution, and one being of relatively lower resolution.

In the exemplary embodiment of a pen positioning system, the aforementioned processes can be carried out by means of a camera which is attached to the pen. To obtain the initial global measurement, the camera uses its low resolution function (e.g. a wide angle lens) to scan the larger quadrilaterals $310_1$ and determine which contains the true end point 248. The camera is also operable to measure, using the low resolution function, the base angles of the identified quadrilateral $310_1$ which contains the true end point 248. The system further includes a processor (located, e.g., within the camera) operable to determine the global position of quadrilateral $310_1$ based upon the base angles of quadrilateral $310_1$. Once the position of the endpoint 248 is located within quadrilateral $310_1$, the position of the pen with respect to the sub-quadrilaterals $330_1$ therein is examined according to the same processes by which the camera, using a higher resolution function (e.g. a zoom lens), scans the sub-quadrilaterals to determine location and base angle measurements of that sub-quadrilateral containing the true end point 248. This method is especially convenient for pen positioning systems, since the larger quadrilaterals $310_1$ contain larger and larger areas as they extend towards the far end corners of the page. For example, the quadrilateral $310_1$ encompasses a larger area than a quadrilateral near the corner 242. Thus, as the big quadrilaterals encompass larger areas, the density of the sub-quadrilaterals can be increased to get a better resolution of the position. Conversely, for smaller quadrilaterals the density of sub-quadrilaterals in them can be reduced while obtaining similar positional resolution as the former case.

Figure 4:
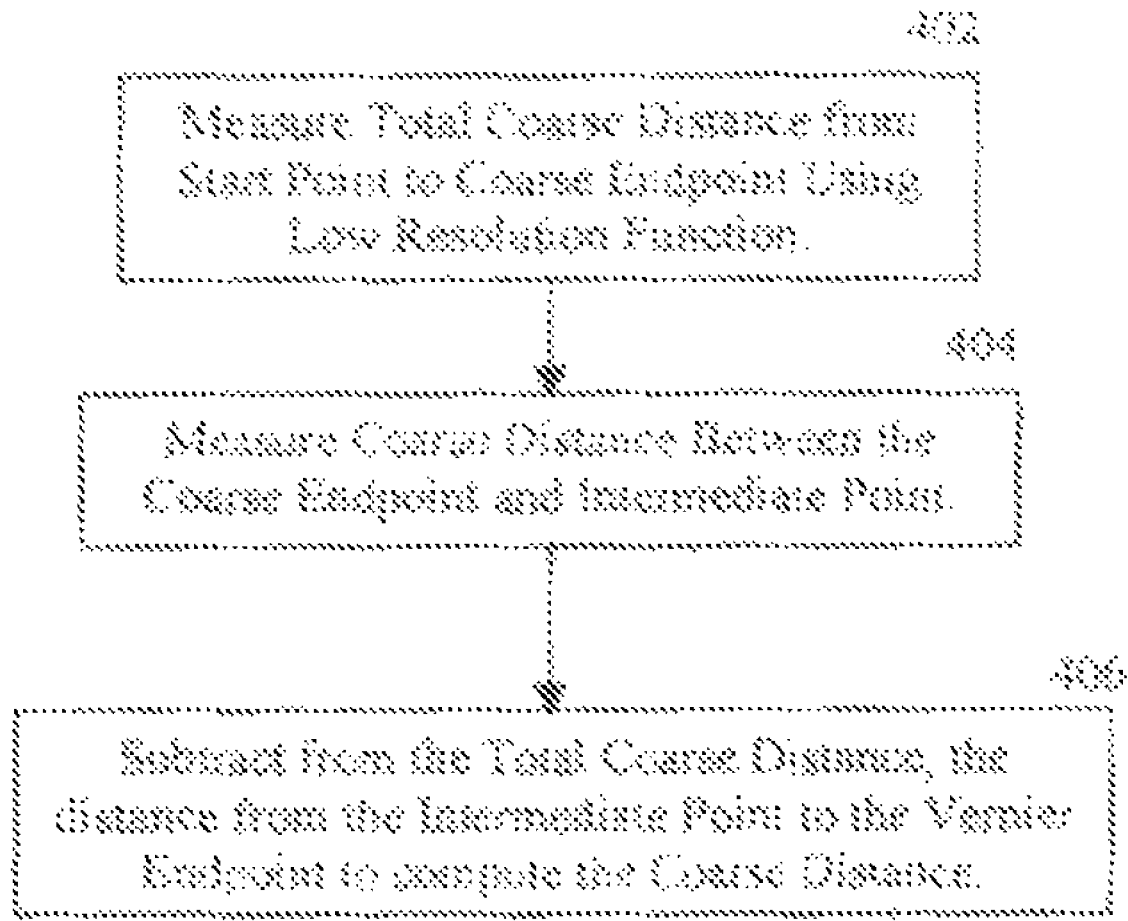
FIG. 4 illustrates an exemplary embodiment of the process for computing a coarse distance shown in FIG. 2A in accordance with the present invention.

FIG. 4 illustrates one exemplary embodiment of the process in 202 described in terms of wavelength processing, whereby the coarse distance (212) is computed. Referring to FIGS. 4 and 2C simultaneously, initially at 402, a total coarse distance L is measured from the start point 242 to a coarse endpoint 246 using the low resolution function wherein the coarse end point 246 includes a point located within a coarse error window 254 located around the true endpoint 248. The magnitude of the coarse error window 254 will correspond to the resolution of the lower resolution function, i.e., the magnitude of the coarse error window 254 will have a larger error window compared to vernier error window 252 corresponding to the lower resolution function. The particular location of the coarse endpoint 246 is shown for purposes for illustration only, and those skilled in the art understand that its particular location within the coarse error window 254 is determined via a random process and cannot be accurately predicted. Accordingly, the coarse endpoint 246 may reside anywhere within the error window 254 in a particular embodiment.

Next, at 404, a distance 213 is measured between the intermediate point 244 and the coarse endpoint 246. In an embodiment, only the low resolution function is used in this measurement. Next at 406, distance 213 is subtracted from the total coarse distance measurement 412 to obtain the first coarse distance provided in process 202.

Collectively, the processes of 402-406 and 204 operate to compute the total estimated distance $d_{est}$ as defined by the following equation:

$$d_{est} = L - (L \bmod \lambda_H) + H \quad (1)$$

where L is the total coarse distance, $\lambda_H$ is the wavelength of the higher resolution function (the shorter wavelength 224), and H is the vernier distance 214.

The description "one unit of the high resolution function" refers to that metric and quantity thereof which is necessary to provide the desired degree of measurement accuracy. For example, in the exemplary embodiment shown in FIG. 2C, the described "one unit of the high resolution function" refers to one wavelength of the higher resolution signal 224, the intermediate point 244 being located such that the intermediate point 244 is not more than substantially one wavelength of the higher resolution signal 224 away from the true end point 248. That is, the intermediate point is located substantially with 360° of the shorter wavelength from the true endpoint 248. In alternative embodiments, a smaller or larger wavelength dimension may be selected as needed to provide the desired level of accuracy.

The unit as to the described "one unit of the higher resolution function" will differ, as those in the art will appreciate, depending upon the particular multi-resolution function used. For example, in the exemplary embodiment of FIG. 3 in which base angle measurements are used as the multi-resolution function, the described "one unit" of the higher resolution function can be a maximum distance or area over which the high resolution base angle measurement can be achieved. For instance, the lower base angle resolution measurement may be $\phi \leq \pm 5°$ over the entire sheet of larger quadrilaterals $310_1$, the higher resolution base angle measurement may be $\phi \leq \pm 1°$ within sub-quadrilaterals $330_1$. Thus in this embodiment, the described "one unit of the higher resolution function" is in terms of distance or area over which the required base angle resolution can be achieved. These represent only a few of the possible embodiments, and those skilled in the art will appreciate that the described "one unit" of the higher resolution function" may be that unit of distance or area, which when used with the higher resolution function, provides the desired degree of accuracy sought for the particular measurement.

In an alternate embodiment, the location of the intermediate point is also a point which is an integer number of units of the higher resolution function away from the start point. In the present exemplary embodiment, the intermediate point 244 is located one unit of the higher resolution function away (e.g., one wavelength) away from the start point, although in other embodiments the intermediate point 244 may be any integer number of units removed therefrom.

Figure 5A:
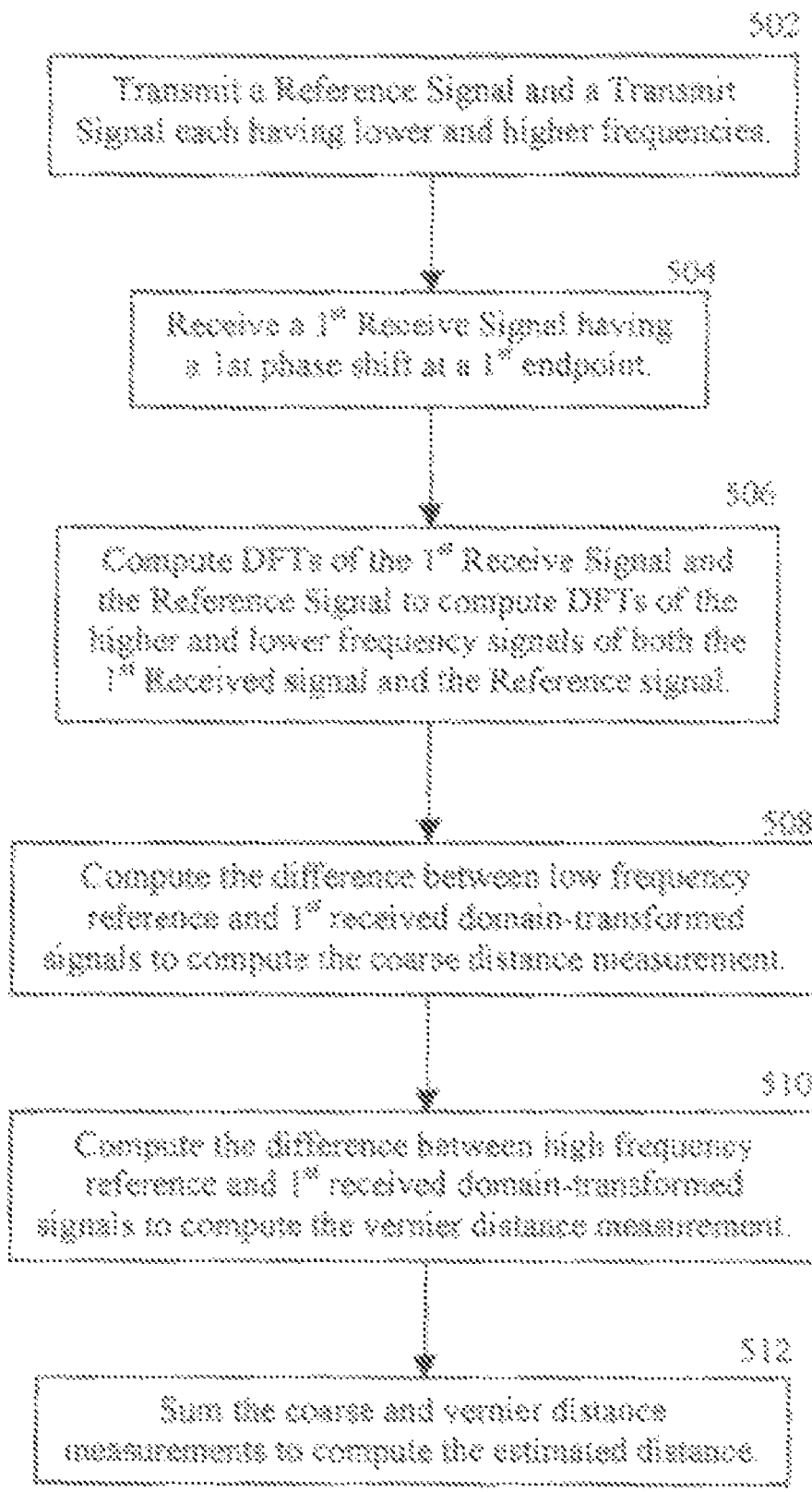
FIG. 5A illustrates a method for accurately estimating a distance between two points using domain transformation techniques in accordance with an embodiment of the present invention.

FIG. 5A illustrates one embodiment for accurately estimating a distance between two points using domain transformation techniques. Initially at 502, reference and transmit signals are transmitted from the start point, each of the reference and transmit signals comprising a lower frequency signal and a higher frequency signal. Next at 504, a first received signal is received at a first true endpoint, the first received signal comprising the lower and higher frequency signals, wherein the lower and higher frequency signals each include a first phase shift relative to the respective higher and lower frequency signals of the reference signal. Next at 506, discrete fourier transforms of the reference and first received signals are computed to produce four quantities: (i) a domain-transformed version of the lower frequency received signal, (ii) a domain-transformed version of the lower frequency reference signal, (iii) a domain-transformed version of the higher frequency received signal and (iv) a domain-transformed version of the higher frequency reference signal.

Subsequently, at 508, a coarse distance measurement for the start point to an intermediate point is computed by measuring the difference in phase between the domain-transformed versions of the reference and received lower frequency signals (i) and (ii). At 510, a vernier distance measurement from the intermediate point to a vernier endpoint is computed by measuring the difference in phase between the domain-transformed versions of the reference and received higher frequency signals (iii) and (iv). At 512, the coarse and vernier distances are summed to compute the total estimated distance between the start and true endpoints.

Figure 5B:
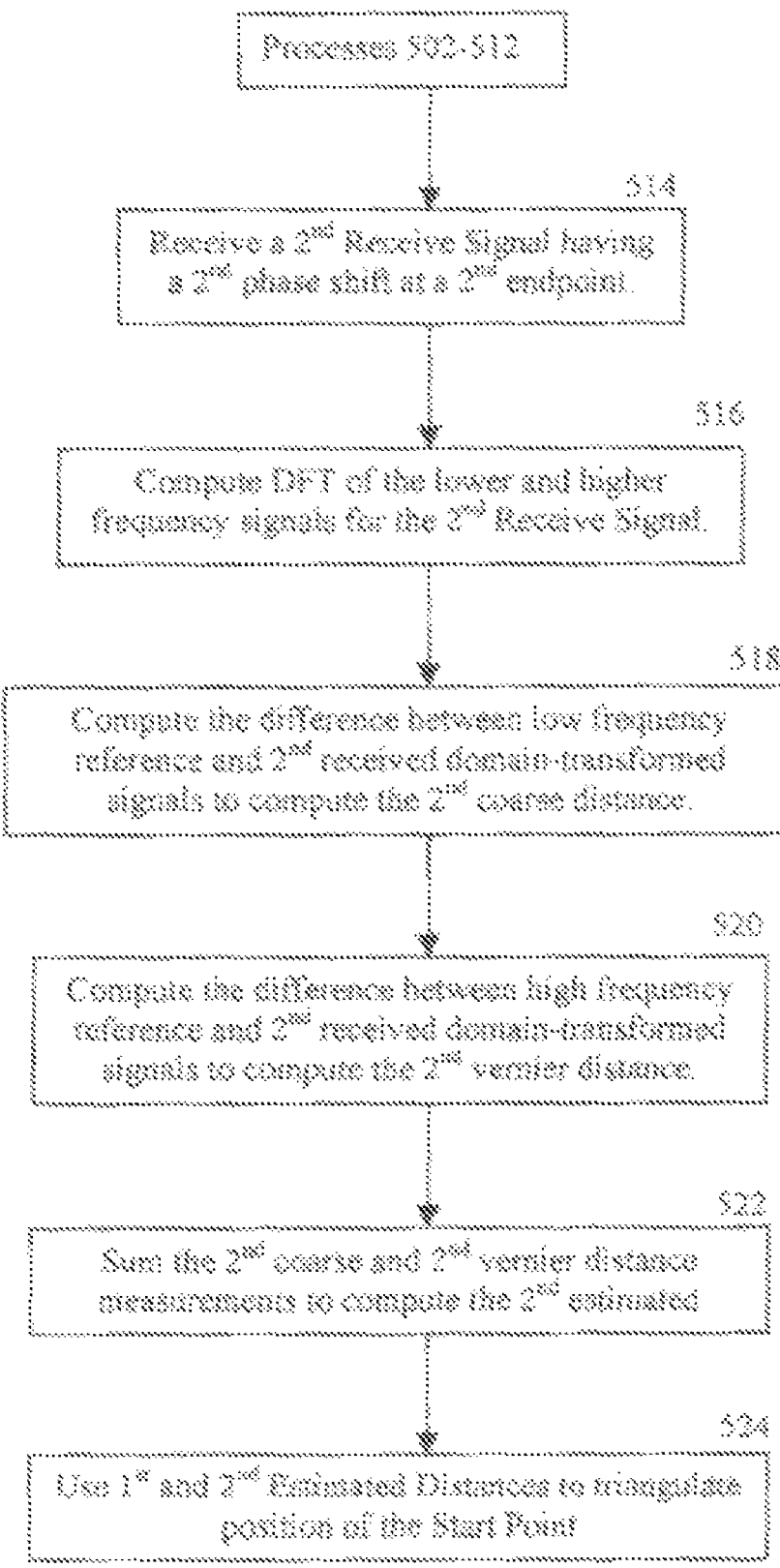
FIG. 5B illustrates a method for locating the position of pen in a pen positioning system using domain transformation techniques in accordance with an embodiment of the present invention.

FIG. 5B illustrates a method for locating the position of the start point relative to two true end points, an example of which is the pen positioning system illustrated in FIG. 1. The method includes the foregoing processes 502-512 as illustrated in FIG. 5A in which the pen position 108 is the start point and points $d_1$ and $d_2$ are two true endpoints. The method further includes process 514 in which a second received signal is received at the second true endpoint $d_1$, the second received signal including the lower frequency signal and the higher frequency signal, each having second phase shift relative to the respective lower and higher frequency signals of the reference signal. Next at 516, the discrete fourier transform of the second received signal is computed to produce: (v) a domain-transformed version of the second received lower frequency signal, and (vi) a domain-transformed version of the second received higher frequency signal.

Next at 518, a second coarse distance measurement is computed by measuring the difference in phase between the domain-transformed versions of the reference and second received lower frequency signals (ii) and (v). At 520, a second vernier distance by measuring the difference in phase between the domain-transformed versions of the reference and second phase-shifted higher frequency signals (iv) and (vi). Subsequently at 522, the second coarse and vernier distances are computed to form a second estimated distance $d_2$. At 524, the first estimated distance $d_1$ computed in processes 502-512, and the second estimated distance $d_2$ computed in processes 514-520 are used to triangulate the position of the starting point, i.e., the pen's position 108.

As readily appreciated by those skilled in the art, the described processes may be implemented in hardware, software, firmware or a combination of these implementations as appropriate. For example, the processes of transmitting and receiving signals may be carried out by hardware component transmitters and receivers (wire line or wireless, electronic, phontonic, or opto-electronic), respectively, each operable to transmit and receive signals at the desired frequency and format. The described phase and distance measurements may be carried out using phase meters or network analyzers (computer-automated, e.g.). Further, the described processes of computing discrete fourier transforms may be computed using logic arrays programmed to compute fast fourier transforms or inverse fast fourier transforms as needed. Further, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

EXAMPLE

The following is an example of the processes shown in FIG. 5A in which domain transformations are used in the computation of the coarse and vernier distances.

The transmit and reference signals are defined as:

$$s(t) = A \sin(2\pi f_c t) + A \sin(2\pi f_f t) \quad (2)$$

and the received signal is:

$$r(t) = A \sin(2\pi f_c t + \Phi_c) + A \sin(2\pi f_f t + \Phi_f) \quad (3)$$

where if the distance to be measured is d then the phase lags are:

$$\Phi_c = \frac{2\pi d f_c}{v} \quad (4)$$

and $$\Phi_f = \frac{2\pi d f_f}{v}.$$

The above phases are the detected phases and they may have error due to the resolution limitation of the detecting device. This results in an error of distance measurement as described above which is reduced by using both the high and low resolution phase information.

Sampling the signal s(t) and r(t) results in:

$$s(nT_s) = A\sin(2\pi f_c n T_s) + A\sin(2\pi f_f n T_s) \quad (5)$$

or $$s(n) = A\sin\left(2\pi \frac{f_c}{f_s} n\right) + A\sin\left(2\pi \frac{f_f}{f_s} n\right). \quad (6)$$

Similarly, $$r(n) = A\sin\left(2\pi \frac{f_c}{f_s} n + \Phi_c\right) + A\sin\left(2\pi \frac{f_f}{f_s} n + \Phi_f\right) \quad (7)$$

Taking the DFTs results in:

$$S(k) = \sum_{n=0}^{N-1} s(n) e^{-\frac{j2\pi nk}{N}} \quad (8)$$

or $$S(k) = \sum_{n=0}^{N-1} \left[ A\sin\left(2\pi \frac{f_c}{f_s} n\right) + A\sin\left(2\pi \frac{f_f}{f_s} n\right) \right] e^{-\frac{j2\pi nk}{N}} \quad (9)$$

or $$S(k) = \sum_{n=0}^{N-1} A \left( \frac{e^{\frac{j2\pi f_c n}{f_s}} - e^{-\frac{j2\pi f_c n}{f_s}}}{2j} \right) e^{-\frac{j2\pi nk}{N}} + A \left( \frac{e^{\frac{j2\pi f_f n}{f_s}} - e^{-\frac{j2\pi f_f n}{f_s}}}{2j} \right) e^{-\frac{j2\pi nk}{N}} \quad (10)$$

or $$S(k) = \sum_{n=0}^{N-1} \frac{A}{2j} e^{j2\pi n\left(\frac{f_c}{f_s} - \frac{k}{N}\right)} - \sum_{n=0}^{N-1} \frac{A}{2j} e^{-j2\pi n\left(\frac{f_c}{f_s} + \frac{k}{N}\right)} + \sum_{n=0}^{N-1} \frac{A}{2j} e^{j2\pi n\left(\frac{f_f}{f_s} - \frac{k}{N}\right)} - \sum_{n=0}^{N-1} \frac{A}{2j} e^{-j2\pi n\left(\frac{f_f}{f_s} + \frac{k}{N}\right)} \quad (11)$$

From above, $$|S(k)| = \frac{NA}{2} \quad (12)$$

and $$\angle S(k) = \begin{cases} -\frac{\pi}{2} \ \forall \quad k = k_1 = \frac{Nf_c}{f_s}, k_2 = \frac{Nf_f}{f_s} \\ +\frac{\pi}{2} \ \forall \quad k = k_1 = N - \frac{Nf_c}{f_s}, k_2 = N - \frac{Nf_f}{f_s} \end{cases}$$

Similarly for r(n) we have, $$|R(k)| = \frac{NA}{2} \quad (13)$$

and $$\angle R(k) = \begin{cases} -\left(\frac{\pi}{2} - \Phi_c\right) \forall & k = k_1 = \frac{Nf_c}{f_s} \\ +\left(\frac{\pi}{2} - \Phi_c\right) \forall & k = k_1 = N - \frac{Nf_c}{f_s} \\ -\left(\frac{\pi}{2} - \Phi_f\right) \forall & k = k_2 = \frac{Nf_f}{f_s} \\ +\left(\frac{\pi}{2} - \Phi_f\right) \forall & k = k_2 = N - \frac{Nf_f}{f_s} \end{cases}$$

Therefore the phase differences for the different frequencies $f_s$ and $f_f$ can be measured with DFT indexes $k_1$ and $k_2$ respectively, and the coarse distance L and high-resolution distance H calculated by the formula:

$$L = \frac{[\angle S(k_1) - \angle R(k_1)]v}{2\pi f_c} \quad (14)$$

$$H = \frac{[\angle S(k_2) - \angle R(k_2)]v}{2\pi f_f} \quad (15)$$

and the estimated distance as provided in (1) is $$d_{est} = L - (L \bmod \lambda_H) + H \quad (16)$$

where $$\lambda_H = \frac{v}{f_f}.$$

The foregoing processes were implemented as MATHLAB code in which the lower and higher resolution functions are lower and higher frequency signals $f_c$ (coarse frequency)=1 KHz and $f_f$ (fine frequency)=10 KHz. The lower resolution signal $f_c$ was chosen to be 1 KHz, as the wavelength of this signal in air coincides roughly to the diagonal distance of an A4 sheet of paper, thus providing a one-to-one correspondence between the phase and distance. The sample frequency $f_s$ was selected at 100 KHz, and the number of samples (N) available per window is 1000. The phase error for both the coarse and fine frequencies was chosen at be 1°.

```
function ( )=digital_vernier(d)
% inputting the distance of the pen 'd' from one of
% the sensor in centimeters gives a 4 tuple vernier estimated
distance est_d
% USE: on MATLAB prompt type digital_vernier(d) where d
is the distance
% Eg:>>digital_vernier(5.67)
fs=100000; % sampling frequency
fc=1000; % coarse frequency
ff=10000; % fine frequency
v=34000; % speed of sound=34000 cm/s
s=100; % requirement of 100 location samples per second for
writing translates to
w=f/s; % time window for each location sample to locate the
position.
lambda_ff=v/ff; % wavelength of high frequency
% sampling the signal
N=fs*w; % number of samples in the given time window w.
n=[0:N-1];
s=sin((2*pi*fc*n)./fs)+sin((2*pi*ff*n)./fs); % original signal through wire
phi_fc_t=(360°d°fc)/v; % phase difference in coarse signal
due to distance d
phi_ff_t=(360°d+ff)/v; % phase difference in fine signal due
to distance d
% assuming the resolution of phase measurement is 1 degree
phi_fc_t=round(phi_fc_t);
phi_ff_t=round(phi_ff_t);
% convert it back to radians
phi_fc=pi*phi_fc_t/180;
phi_ff=pi*phi_ff_t/180;
% received signal and phase estimated with error due to
resolution of the detector
r=sin((2*pi*fc*n)./fs+phi_fc)+sin(2*pi*ff*n)./fs+phi_ff);
% the frequency point of interest
k1=(fc/fs)*N+1; % an additional 1 is because matlab numbers from 1 and not from 0 as in DFT
k2=(ff/fs)*N+1;
% taking the FFT
S=fft(s);
R=fft(r);
% finding the phase
Ph_S=angle(S);
Ph_R=angle(R);
% taking the phase difference of the desired frequency point
k1 and k2
diff_ph_fc=abs(Ph_S(k1)-Ph_R(k1));
diff_ph_ff=abs(Ph_S(k2)-Ph_R(k2));
% calculating the distance from the detector and accounting
for phases
% returned by MATLAB with modulo 2*pi
est_d_fc_1=(diff_ph_fc*v)/(2*pi*fc);
est_d_fc_2=v/fc-est_d_fc_1;
est_d_ff_1=(diff_ph_ff*v)/(2*pi*ff);
est_d_ff_2=v/ff-est_d_ff_1;
% corrected distance with main reading and vernier reading
est_d(1)=(est_d_fc_1-rem(est_d_fc_1, lambda_ff))+est_d_ff_1;
est_d(2)=(est_d_fc_1-rem(est_d_fc_1, lambda_ff))+est_d_ff_2;
est_d(3)=(est_d_fc_2-rem(est_d_fc_2, lambda_ff))+est_d_ff_1;
est_d(4)=(est_d_fc_2-rem(est_d_fc_2, lambda_ff))+est_d_ff_2;
est_d
```

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for estimating the distance between a start point and a true end point using multi-resolution functions, the multi-resolution functions including at least two functions, one being of relatively higher resolution and one being of relatively lower resolution, the relatively higher resolution function comprising a higher frequency signal with a shorter wavelength, and the relatively lower resolution function comprising a lower frequency signal with longer wavelength, the method comprising:

measuring, using the longer wavelength, a coarse distance from the start point to an intermediate point, the intermediate point comprising a point that is located between the start point and the true endpoint;

measuring, using the shorter wavelength, a vernier distance from the intermediate point to a vernier endpoint, the vernier endpoint located within a vernier error window located around the true endpoint; and summing the coarse distance with the vernier distance to obtain an estimated distance between the start point and the true endpoint.

2. The method of claim 1, wherein measuring a coarse distance from the start point to the intermediate point comprises:

measuring, using the longer wavelength, a total coarse distance from the start point to a coarse endpoint, the coarse endpoint comprising a point located within an coarse error window located around the true endpoint;

measuring the distance between the coarse endpoint to the intermediate point; and subtracting from the total coarse distance, the distance measured from the intermediate point to the coarse endpoint to determine said coarse distance.

3. The method of claim 1, wherein measuring a coarse distance comprises measuring the phase difference of the wavelength of the lower frequency signal from the start point to the intermediate point.

4. The method of claim 3, wherein measuring a vernier distance comprises measuring the phase difference of the wavelength of the higher frequency signal from the intermediate point to the vernier endpoint.

5. The method of claim 4, further comprising:

transmitting, from the start point, a transmit signal comprising the lower frequency signal and the higher frequency signal;

transmitting, from the start point, a reference signal comprising the lower frequency signal and the higher frequency signal;

receiving at the true endpoint, a first received signal comprising the lower and higher frequency signals, wherein the lower and higher frequency signals each comprises a first phase shift relative to the respective higher and lower frequency signals of the reference signal;

computing the discrete fourier transform of the reference signal and first received signal to produce: (i) a domain-transformed version of the lower frequency received signal, (ii) a domain-transformed version of the lower frequency reference signal, (iii) a domain-transformed version of the higher frequency received signal and (iv) a domain-transformed version of the higher frequency reference signal, wherein measuring the coarse distance comprises measuring the difference in phase between the domain-transformed versions of the reference and received lower frequency signals (i) and (ii), and wherein measuring the vernier distance comprises measuring the difference in phase between the domain-transformed versions of the reference and received higher frequency signals (iii) and (iv).

6. The method of claim 5, further comprising:

receiving, at a second true endpoint, a second received signal, the second received signal comprising the lower frequency signal and the higher frequency signal, wherein the lower and higher frequency signals each comprises a second phase shift relative to the respective lower and higher frequency signals of the reference signal;

computing the discrete fourier transform of the second received signal to produce: (v) a domain-transformed version of the second received lower frequency signal, and (vi) a domain-transformed version of the second received higher frequency signal;

measuring a second coarse distance from the start point to a second intermediate point comprising measuring the difference in phase between the domain-transformed versions of the reference and second received lower frequency signals (ii) and (v); and measuring a second vernier distance from the second intermediate point to a second vernier endpoint comprising measuring the difference in phase between the domain-transformed versions of the reference and second phase shifted higher frequency signals (iv) and (vi), wherein the sum of the coarse and vernier distance measurements comprise a first estimated distance, wherein the sum of the second coarse and vernier distance measurements comprise a second estimated distance, and wherein the first and second estimated distances form a distance pair for triangulating the position of the start point.

7. A system to estimate the distance between a start point and a true end point using multi-resolution functions, the multi-resolution functions including at least two functions, one being of relatively higher resolution and one being of relatively lower resolution, the relatively higher resolution function comprising a higher frequency signal with a shorter wavelength, and the relatively lower resolution function comprising a lower frequency signal with longer wavelength, the system comprising:

means for measuring, using the longer wavelength, a coarse distance from the start point to an intermediate point, the intermediate point comprising a point that is located between the start point and the true endpoint;

means for measuring, using the shorter wavelength, a vernier distance from the intermediate point to a vernier endpoint, the vernier endpoint located within a vernier error window located around the true endpoint; and means for summing the coarse distance with the vernier distance to obtain an estimated distance between the start point and the true endpoint.

8. The system of claim 7, wherein the means for measuring a coarse distance from the start point to the intermediate point comprises:

means for measuring, using the longer wavelength, a total coarse distance from the start point to a coarse endpoint, the coarse endpoint comprising a point located within an coarse error window located around the true endpoint;

means for measuring the distance between the coarse endpoint to the intermediate point; and means for subtracting from the total coarse distance, the distance measured from the intermediate point to the coarse endpoint to determine said coarse distance.

9. The system of claim 7, wherein the means for measuring a coarse distance comprises means for measuring the phase difference of the wavelength of the lower frequency signal from the start point to the intermediate point.

10. The system of claim 9, wherein the means for measuring a vernier distance comprises means for measuring the phase difference of the wavelength of the higher frequency signal from the intermediate point to the vernier endpoint.

11. The system of claim 10, further comprising:

means for transmitting, from the start point, a transmit signal comprising the lower frequency signal and the higher frequency signal;

means for transmitting from the start point, a reference signal comprising the lower frequency signal and the higher frequency signal;

means for receiving at the true endpoint, a first received signal comprising the lower and higher frequency signals, wherein the lower and higher frequency signals each comprises a first phase shift relative to the respective higher and lower frequency signals of the reference signal;

means for computing the discrete fourier transform of the reference signal and first received signal to produce: (i) a domain-transformed version of the lower frequency received signal, (ii) a domain-transformed version of the lower frequency reference signal, (iii) a domain-transformed version of the higher frequency received signal and (iv) a domain-transformed version of the higher frequency reference signal, wherein the means for measuring the coarse distance comprises means for measuring the difference in phase between the domain-transformed versions of the reference and received lower frequency signals (i) and (ii), and wherein the means for measuring the vernier distance comprises means for measuring the difference in phase between the domain-transformed versions of the reference and received higher frequency signals (iii) and (iv).

12. The system of claim 11, further comprising:

means for receiving, at a second true endpoint, a second received signal, the second received signal comprising the lower frequency signal and the higher frequency signal, wherein the lower and higher frequency signals each comprises a second phase shift relative to the respective lower and higher frequency signals of the reference signal;

means for computing the discrete fourier transform of the second received signal to produce: (v) a domain-transformed version of the second received lower frequency signal, and (vi) a domain-transformed version of the second received higher frequency signal;

the system further comprising:

means for measuring a second coarse distance from the start point to a second intermediate point comprising means for measuring the difference in phase between the domain-transformed versions of the reference and second received lower frequency signals (ii) and (v); and means for measuring a second vernier distance from the second intermediate point to a second vernier endpoint comprising means for measuring the difference in phase between the domain-transformed versions of the reference and second phase-shifted higher frequency signals (iv) and (vi), wherein the sum of the coarse and vernier distance measurements comprise a first estimated distance, wherein the, sum of the second coarse and vernier distance measurements comprise a second estimated distance, and wherein the first and second estimated distances form a distance pair for triangulating the position of the start point.

13. A non-transitory computer-readable medium on which is embedded a computer program product that when executed by a computer processor is to execute instruction code for estimating the distance between a start point and a true end point using multi-resolution functions, the multi-resolution functions including at least two functions, one being of relatively higher resolution and one being of relatively lower resolution, the relatively higher resolution function comprising a higher frequency signal with a shorter wavelength, and the relatively lower resolution function comprising a lower frequency signal with longer wavelength, the computer program product comprising:

instruction code to measure, using the longer wavelength, a coarse distance from the start point to an intermediate point, the intermediate point comprising a point that is located between the start point and the true endpoint;

instruction code to measure, using the shorter wavelength, a vernier distance from the intermediate point to a vernier endpoint, the vernier endpoint located within a vernier error window located around the true endpoint; and instruction code to sum the coarse distance with the vernier distance to obtain an estimated distance between the start point and the true endpoint.

14. The non-transitory computer readable medium of claim 13, wherein the instruction code to measure a coarse distance from the start point to the intermediate point comprises:

instruction code to measure, using the longer wavelength, a total coarse distance from the start point to a coarse endpoint, the coarse endpoint comprising a point located within an coarse error window located around the true endpoint;

instruction code to measure the distance between the coarse endpoint to the intermediate point; and instruction code to subtract from the total coarse distance, the distance measured from the intermediate point to the coarse endpoint to determine said coarse distance.

15. The non-transitory computer readable medium of claim 13, wherein the instruction code to measure a coarse distance comprises instruction code to measure the phase difference of the wavelength of the lower frequency signal from the start point to the intermediate point.

16. The non-transitory computer readable medium of claim 15, wherein the instruction code to measure a vernier distance comprises instruction code to measure the phase difference of the wavelength of the higher frequency signal from the intermediate point to the vernier endpoint.

17. The non-transitory computer readable medium of claim 16, further comprising:

instruction code to transmit, from the start point, a transmit signal comprising the lower frequency signal and the higher frequency signal;

instruction code to transmit from the start point, a reference signal comprising the lower frequency signal and the higher frequency signal;

instruction code to receive at the true endpoint, a first received signal comprising the lower and higher frequency signals, wherein the lower and higher frequency signals each comprises a first phase shift relative to the respective higher and lower frequency signals of the reference signal;

instruction code to compute the discrete fourier transform of the reference signal and first received signal to produce: (i) a domain-transformed version of the lower frequency received signal, (ii) a domain-transformed version of the lower frequency reference signal, (iii) a domain-transformed version of the higher frequency received signal and (iv) a domain-transformed version of the higher frequency reference signal, wherein the instruction code to measure the coarse distance comprises instruction code to measure the difference in phase between the domain-transformed versions of the reference and received lower frequency signals (i) and (ii), and wherein the instruction code to measure the vernier distance comprises instruction code to measure the difference in phase between the domain-transformed versions of the reference and received higher frequency signals (iii) and (iv).

18. The non-transitory computer readable medium of claim 17, further comprising:

instruction code to receive, at a second true endpoint, a second received signal, the second received signal comprising the lower frequency signal and the higher frequency signal, wherein the lower and higher frequency signals each comprises a second phase shift relative to the respective lower and higher frequency signals of the reference signal;

instruction code to compute the discrete fourier transform of the second received signal to produce: (v) a domain-transformed version of the second received lower frequency signal, and (vi) a domain-transformed version of the second received higher frequency signal;

the computer program product further comprising:

instruction cede to measure a second coarse distance from the start point to a second intermediate point comprising instruction code to measure the difference in phase between the domain-transformed versions of the reference and second received lower frequency signals (ii) and (v); and instruction code to measure a second vernier distance from the second intermediate point to a second vernier end point comprising instruction code to measure the difference in phase between the domain-transformed versions of the reference and second phase-shifted higher frequency signals (iv) and (vi), wherein the sum of the coarse and vernier distance measurements comprise a first estimated distance, wherein the sum of the second coarse and vernier distance measurements comprise a second estimated distance, and wherein the first and second estimated distances form a distance pair for triangulating the position of the start point.

19. A method for estimating the distance between a start point and a true end point using multi-resolution functions, the multi-resolution functions including at least two functions, one being of relatively higher resolution and one being of relatively lower resolution, the method comprising:

measuring, using the lower resolution function, a coarse distance from the start point to an intermediate point, the intermediate point comprising a point that is located between the start point and the true endpoint;

measuring, using the higher resolution function, a vernier distance from the intermediate point to a vernier endpoint, the vernier end point located within a vernier error window located around the true endpoint, wherein the magnitude of vernier error window corresponds to the resolution of the higher resolution function; and summing the coarse distance with the vernier distance to obtain an estimated distance between the start point and the true endpoint.

20. The method of claim 19, wherein measuring a coarse distance from the start point to the intermediate point comprises:

measuring, using the lower resolution function, a total coarse distance from the start point to a coarse endpoint, the coarse endpoint comprising a point located within an coarse error window located around the true endpoint, wherein the magnitude of the coarse error window corresponds to resolution of the lower resolution function;

measuring the distance between the coarse endpoint to the intermediate point; and subtracting from total coarse distance, the distance measured from the intermediate point to the coarse endpoint to determine said coarse distance.

21. The method of claim 19, wherein the lower resolution function comprises the wavelength of a lower frequency signal compared to the higher resolution function which comprises the wavelength of a higher frequency signal, and wherein measuring a coarse distance comprises measuring the phase difference of the wavelength of the lower frequency signal from the start point to the intermediate point.

22. The method of claim 21, wherein measuring a vernier distance comprises measuring the phase difference of the wavelength of the higher frequency signal from the intermediate point to the vernier endpoint.

23. The method of claim 19, wherein the lower resolution function comprises a lower resolution base angle measurement compared to the higher resolution function which comprises a higher resolution base angle measurement, and wherein measuring a coarse distance comprises:

determining, the true end point is within a quadrilateral having a set of unique base angles; and determining using the lower resolution base angle measurement, which quadrilateral among a plurality of quadrilaterals possesses the set of the unique base angles; and measuring the distance between the start point to the center of the quadrilateral having the set of unique base angles, wherein the center of the quadrilateral comprises the intermediate point.

24. The method of claim 23, wherein measuring a vernier distance comprises:

determining the true end point is, within a sub-quadrilateral having a set of unique, sub-base angles;

determining, using the higher resolution base angle measurement, which sub-quadrilateral among a plurality of sub-quadrilaterals possesses the set of the unique sub-base angles; and measuring the distance between the intermediate point to the center of the sub-quadrilateral having the set of unique sub-base angles.

* * * * *

UNITED STATES PATENT AND TRADEMARK OFFICE
CERTIFICATE OF CORRECTION

PATENT NO. : 8,195,425 B2  Page 1 of 1
APPLICATION NO. : 11/718233
DATED : June 5, 2012
INVENTOR(S) : Shekhar Ramachandra Borgaonkar et al.

It is certified that error appears in the above-identified patent and that said Letters Patent is hereby corrected as shown below:

In column 13, line 54, in Claim 12, delete "the," and insert -- the --, therefor.

In column 16, line 33, in Claim 23, delete "determining," and insert -- determining --, therefor.

In column 16, line 35, in Claim 23, delete "determining" and insert -- determining, --, therefor.

In column 16, line 45, in Claim 24, delete "is," and insert -- is --, therefor.

In column 16, line 46, in Claim 24, delete "unique," and insert -- unique --, therefor.

Signed and Sealed this
Eighteenth Day of December, 2012

David J. Kappos
*Director of the United States Patent and Trademark Office*